United States Patent [19]
Leistner

[11] 3,738,244
[45] June 12, 1973

[54] CAMERA WITH AUTOMATICALLY OPERATING EXPOSURE MEANS

[75] Inventor: Rudolf Leistner, Munich, Germany

[73] Assignee: Braun A.G., Frankfurt (Main), Germany

[22] Filed: June 11, 1971

[21] Appl. No.: 152,281

[30] Foreign Application Priority Data
June 18, 1970 Germany.................. P 20 29 930.3

[52] U.S. Cl............................. 95/31 FS, 352/78 C
[51] Int. Cl. ........................................... G03b 19/04
[58] Field of Search............ 95/10 C, 31 FS, 10 FS; 352/78 C

[56] References Cited
UNITED STATES PATENTS

| 3,312,158 | 4/1967 | MacMillin et al................ 352/78 C |
| 3,481,259 | 12/1969 | Langnau et al...................... 95/10 C |
| 3,505,937 | 4/1970 | Albedyll et al...................... 95/10 C |
| 3,491,670 | 1/1970 | Rentschler......................... 95/31 FS |
| 3,212,421 | 10/1965 | Hackenberg...................... 95/31 FS |
| 2,080,055 | 5/1937 | Martin................................ 95/10 C |
| 3,601,024 | 8/1971 | Pagel................................. 95/31 FS |
| 3,368,467 | 2/1968 | Hahn.................................. 95/10 C |
| 3,125,939 | 3/1964 | Bundschub et al................ 95/10 C |

Primary Examiner—Samuel S. Matthews
Assistant Examiner—Russell E. Adams, Jr.
Attorney—Ernest F. Marmorek

[57] ABSTRACT

A camera comprising automatic exposure arrangement having a control device operatively connected to it and adapted to transmit to the exposure arrangement film sensitivity values determined by control marks on the picture receiving material inserted into the camera, and a manual adjusting device for moving the control device out of the plane of influence of the control marks and for moving the control device outside such plane over a range permitting the input of a predetermined range of film sensitivity values into the exposure arrangement.

9 Claims, 4 Drawing Figures

3,738,244

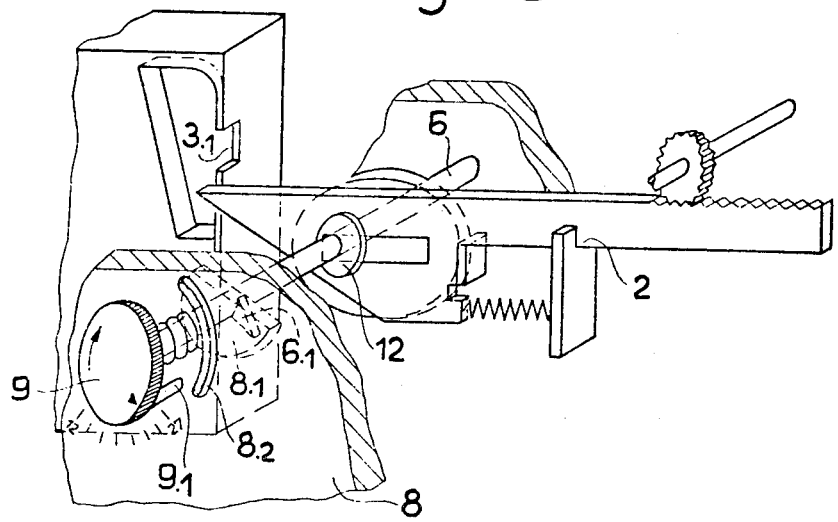
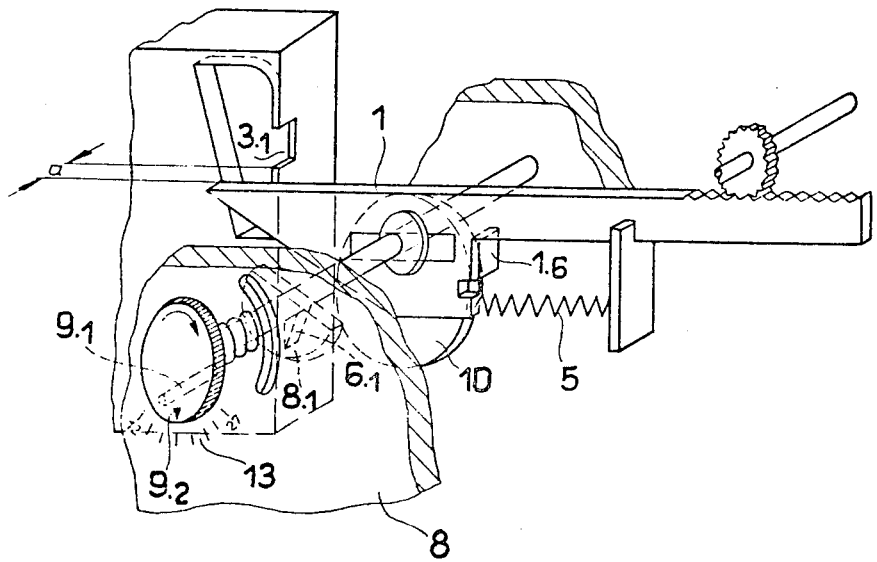

CAMERA WITH AUTOMATICALLY OPERATING EXPOSURE MEANS

FIELD OF THE INVENTION

The present invention relates to a camera with automatically operating exposure means which are associated with control means for the automatic setting of the value of the film sensitivity, which control means cooperate with control markers at the carrier of the film material, such as a cassette.

BACKGROUND OF THE INVENTION

It is known to provide in such automatic exposure means the possibility of correcting the exposure value which on one hand has been measureed and on the other hand has been put in by a control marker provided at the carrier of the film material, such as for instance a film cassette. More specifically, in the known arrangement this is accomplished by separating the gear train following the member feeling or sensing the cassette control marker, the gear train putting the value of the film sensitivity predetermined by the cassette control marker into the exposure measuring circuit of the automatic exposure means. The separating point is formed by a clutch or coupling by means of which, with the help of a manual adjusting means, that portion of the gear train which follows the clutch or coupling is adjustable with respect to the portion of the gear train which comprises sealing member. By means of this coupling or clutch to be actuated by the manual feeling or sensing means, thus in a relatively simple manner additional exposure factors that may appear desirable for the respectively prevailing picture-taking situation may be put into the measuring circuit of the exposure means. The relatively large amount of gears required for putting the additional factors in the automatic exposure means of the camera, is very disadvantageous.

It is, therefore, an object of the present invention to provide a camera with automatic exposure means which will permit influencing or correcting of the exposure value determined by the automatic exposure means, with very simple elements which will keep the number of gears in, and complexity of, the gear train involved in the area of the automatic exposure means of the camera to a minimum.

BRIEF SUMMARY OF THE INVENTION

The problem has been solved with a camera of the above mentioned type, which is provided with control means for cooperating with a control marker at the film carrier for automatically putting in the film sensitivity, in accordance with the present invention, by manual adjusting means associated with the camera by means of which the control means putting in the film sensitivity values, may be brought out of the effective plane of the film carrier control markers and may be moved outside this plane in the entire sensitivity adjustment range, in a properly functioning manner.

Due to this relatively simple and easily accomplished placement of the control means putting the film sensitivity values into the automatic exposure means, out of the plane of influence or effectiveness of the control markers of the film carrier, it is possible to manually influence the exposure automatic means without expensive and extensive gear trains engaging the gear train following the control means.

BRIEF DESCRIPTION OF THE DRAWINGS

The invention is illustrated by way of example in a cassette camera in the following drawings, in which:

FIG. 2b shows the device near the manually controllable position, but outside the action plane;

FIG. 3 shows the device in the manual position permitting putting at will film sensitivity and correcting values into the camera.

DETAILED DESCRIPTION OF A PREFERRED EMBODIMENT OF THE INVENTION

Figure 1:
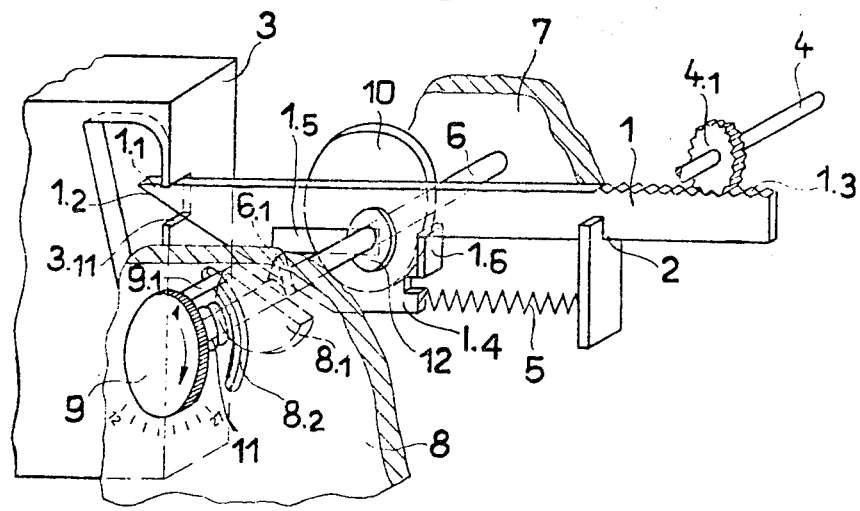
FIG. 1 shows a device for setting or correcting film sensitivity values in the exposure means of the camera, said device being controllable manually as well as automatically by the cassette.

Referring now to the drawings in detail, the device for setting the film sensitivity values into an automatic exposure means of a camera, comprises a feeler or sensing slide 1 which is guided at 2 so as to be longitudinally slidable and tiltable by a small amount. The feeler slide comprises an inclined feeler tip 1.1 which engages a cut-out portion 3.1 of a film cassette 3 inserted into the camera. As is well known in the art, the distance between the lower edge 3.11 with respect to the upper edge of the cut-out portion which latter edge is always in the same location, determines the value the film sensitivity of the film material in the cassette, such as for instance a super-8 film. The lower edge 3.11, therefore, determines the depth of penetration of the feeler slide 1 into the cut-out portion 3.1 which forms the control mark of the film cassette 3 that indicates the film sensitivity.

The amount by which the feeler slide 1 penetrates into the cut-out portion 3.1 until abutment of its inclined surface 1.2 against the above mentioned control edge 3.11 is transferred by means of a gear rack 1.3 onto a pinion 4.1. The rotation of the pinion 4.1 is communicated to a mechanically, electrically, or optically effective, continously adjustable control member in the exposure circuit of the camera (not shown) by means of a shaft 4. This control member, which may be formed for instance by a variable resistance in the measuring circuit, or by an adjustable diaphragm in front of a photoelectric transducer of the automatic exposure means puts the value of the film sensitivity indicated by the cassette control mark 3.1, 3.11 into the exposure circuit.

A compression spring 5 which on one hand abuts against a ridge 2 of the housing of the camera and on the other hand against an extension 1.4 of the slide 1, tends to press the slide 1 continuously against the cassette 3 so that engagement of the inclined surface 1.2 with the edge 3.11 of the cassette control mark 3.1 is assured.

The extension 1.4 of slide 1 is provided with a slot 1.5 which permits passage of a control shaft 6 therethrough which is journaled in wall portions 7 and 8 of the housing. A radially effective control curve or cam 10 is mounted on shaft 6 and cooperates with an the extension 1.6 of the slide 1, which is bent at right angles to extension 1.4. The end portion of the shaft 6 projecting towards the outside of the housing has mounted thereon a knob 9.

Figure 2A:
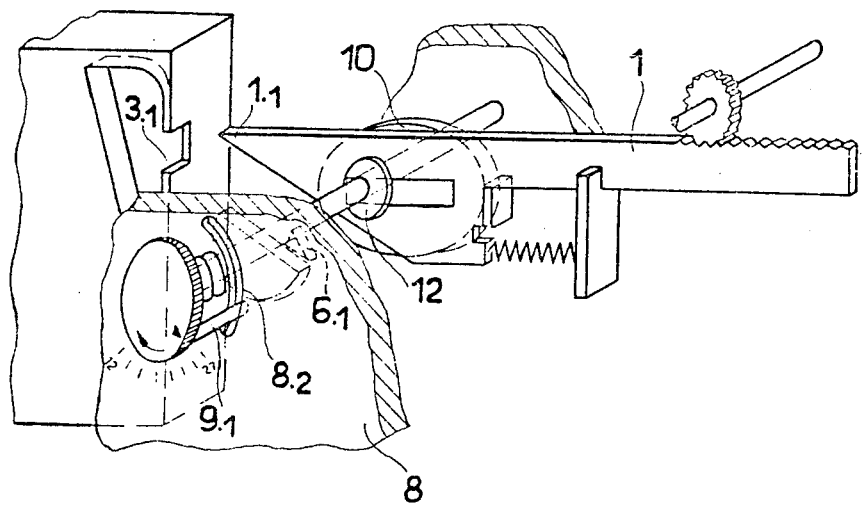
FIG. 2a shows the device of FIG. 1 during transfer in the plane of action to the manually controllable position.

The control shaft 6 has also mounted thereon an arresting cam 6.1 which, in accordance with FIGS. 1 and 2a, slides along the inside of the housing wall 8, and more specifically under the influence of a pressure spring 11 provided between the housing wall 8 and the knob 9. A semi-circular recess 8.1 on the inside of the housing 8 serves for receiving the arresting cam 6.1 in the manual position of the device. For purposes of fixing this manual position a safety pin 9.1 arranged and is provided at the knob 9, which in the automatic position according to FIG. 1 penetrates a slot 8.2 in the housing wall 8, which slot is in the shape of an arc of a circle.

If the device for the input of the film sensitivity value into the automatic exposure means of the camera, is to be transferred from the automatic position according to FIG. 1 into its manual position, the feeler slide 1 is first brought into the position shown in FIG. 2a in which its nose portion 1.1 is moved back out of the range of influence of the cassette control mark 3.1.

This backward movement of slide 1 is effected by a rotation of the control curve 10 by approximately 90° into the position according to FIG. 2a. This in turn is effected by knob 9 being turned in clockwise direction. During this rotation in clockwise direction, the safety pin 9.1 has passed through the slot 8.2 and the arresting cam 6.1 has slid along the inside of wall 8.

If knob 9 is rotated further by a small amount in clockwise direction, the arresting cam 6.1 moves into the area of the recess 8.1 of the housing 8 into which it moves in a sudden manner under the influence of pressure spring 11. With the sudden forward movement of the shaft 6 connected therewith, the safety pin 9.1 is moved out of the range of the slot 8.2 of housing wall 8 so that now knob 9, as shown in FIG. 2b, is freely rotatable beyond the area of the slot. Upon accidental depression of knob 9 safety pin 9.1 abuts against the outside of the wall 8 to guarantee that the control shaft 6 and thereby the knob 9 remain in the manual position of the device permitting the manual input of film sensitivity or correcting values.

With the sudden forward movement of control shaft 6, the feeler slide 1 has been tilted out of the plane of engagement of the cassette control mark 3.1, the tilting having taken place about the guide portion 2. This movement of the slide 1 is effected by means of the control disc 10 resting against the backside of slide 1. A safety disc 12 abutting against the front side of the slide and engaging an annular groove of the shaft 6, return the slide 1 into the automatic position shown in FIG. 1.

The slide 1 tilted into its manual position according to FIG. 2b, may now be displaced again into the direction of the cassette, in accordance with FIG. 3, for displacement by a distance a into the plane of engagement of the cassette markers. This is effected by rotation of the control curve or cam 10 through a further 90° angle in clockwise direction, in other words in downward direction. Slide 1, which continuously engages the circumference of cam 10 with its abutment 1.6, under the influence of the pressure spring 5, due to this movement comes again into the film sensitivity adjustment range by marker 3.1. It may occupy the same positions that are predetermined in the automatic position by the different cassette control marks 3.1 and 3.11, merely laterally offset by the distance a with respect to the cut-out portion 3.1 of the cassette.

The slide 1 in the manual position can move through the entire film sensitivity adjustment range in a continuous manner by rotating the control curve 10, which makes is possible to put any film sensitivity value, even intermediate values, i.e. fractions of any ASA-value, into the exposure automatic means of the camera. This is extremely important for taking into account correcting factors, such as filter factors.

The knob 9 effecting adjustment of the slide 1 in the manual control range is provided with an indicating marker 9.2 which is movable along a scale 13 indicating the film sensitivity values in view of the rotation of knob 9, so that the user of the camera may be informed at anytime about the adjusted actual film sensitivity value.

For purposes of switching over into the automatic position, the knob 9 is turned in counter-clockwise direction whereby the control curve 10 moves the slide 1 back, i.e. the tip of the feeler out of the range of the cassette. If the knob 9 has been turned so that the safety pin 9.1 moves into the range of the slot 8.2, it is pressed into the same against the pressure of spring 11 so that the arresting cam 6.1 is lifted out of the recess 8.2 whereupon the arresting cam 6.1 upon further rotation of knob 9 by a small amount, comes to rest again at the inside of housing 8.

By pressing the knob 9, by means of the safety disc 12, the slide 1 has been tilted again into its automatic position. Upon further rotation of the control curve 10 in upper position according to FIG. 1, in counter-clockwise direction, the slide 1 is free to move with its tip 1.1 into the cut-out portion 3.1 of the cassette forming the film sensitivity control mark. With its inclined surface 1.2, the slide 1 abuts against the control edge 3.11 so that the film sensitivity value indicated by cassette control mark 3.1, 3.11 is again put into the automatic exposure means of the camera.

From the above, it is apparent that although the invention has been described hereinbefore with respect to a certain specific embodiment thereof, it is evident that many modifications and changes may be made without departing from the spirit of the invention. Accordingly, by the appended claims, I intend to cover all such modifications and changes as fall within the true spirit and scope of this invention.

I claim:

1. In a camera having automatic exposure means, film supporting means insertable into said camera and being provided with a control aperture, the height of which corresponds to sensitivity values of the film in said film supporting means,
   in combination,
   control means adapted to be operatively connected to said exposure means and operable into and out of said control aperture, the movements into the aperture being limited by said height, in a plane, to indicate automatically the film sensitivity value determined by said control aperture,
   manual adjusting means coupled to said control means and being operable for optionally moving said control means out of and, respectively, into said plane for setting said control means outside said plane over a predetermined range of the film sensitivity values.

2. A camera according to claim 1, wherein said control means comprises a slide means movable by said manual adjusting means between a first position in which said slide means is adapted to engage the control aperture in said plane and, respectively, a second position in which said slide means is outside said plane and continuously movable over said range.

3. A camera according to claim 2, which comprises guide means pivotally supporting said slide means for moving said slide means from said first into said second position and vice versa.

4. A camera according to claim 2, wherein said manual adjusting means is rotatably journaled in said camera and is reciprocable in the direction of the axis of rotation of said adjusting means, the connection between said manual adjusting means and said slide means being such that reciprocation of said manual adjusting means along said axis effects movement of said slide means from said first position to said second position and vice versa and that rotation of said manual adjusting means about said axis effects movement of said slide means over said range.

5. A camera according to claim 4, wherein said manual adjusting means comprises control shaft means, cam means mounted on said control shaft means, abutment means mounted on said slide means, and spring means urging said slide means in a direction towards engagement with the control aperture on the picture receiving material inserted into said camera, said cam means cooperating with said abutment means until said shaft means has been rotated to a predetermined limiting position permitting movement of said slide means from said first to said second position.

6. A camera according to claim 5, wherein said manual adjusting means comprises arresting cam means, wall means in said camera rotatably supporting said shaft means, said cam means being mounted on said shaft means and sliding on said wall means, said cam means being adapted to permit tilting of said slide means from said first to said second position only when said shaft means has been rotated to a position in which said slide means is outside the range of said control aperture.

7. A camera according to claim 6, wherein said manual adjusting means comprises pin means, said wall means being provided with slot means receiving said pin means in the first position of said slide means, said pin means being outside and out of alignment with said slot means in the second position of said slide means, to thereby prevent accidental movement of said shaft means in axial direction thereof in said second position.

8. A camera according to claim 3, wherein said manual adjusting means is rotatably journaled in said camera and is reciprocable in the direction of the axis of rotation of said adjusting means, the connection between said manual adjusting means and said slide means being such that reciprocation of said manual adjusting means along said axis effects movement of said slide means from said first position to said second position and vice versa and that rotation of said manual adjusting means about said axis effects movement of said slide means over said range.

9. A camera according to claim 3, wherein said manual adjusting means comprises control shaft means, cam means mounted on said control shaft means, abutment means mounted on said slide means, and spring means urging said slide means in a direction towards engagement with the control aperture on the picture receiving material inserted into said camera, said cam means cooperating with said abutment means until said shaft means has been rotated to a predetermined limiting position permitting movement of said slide means from said first to said second position.

* * * * *